(12) United States Patent
Kwon et al.

(10) Patent No.: US 11,455,363 B2
(45) Date of Patent: Sep. 27, 2022

(54) ELECTRONIC DEVICE AND METHOD FOR ACCESSING SERVER BY SAME

(71) Applicant: Samsung Electronics Co., Ltd., Suwon-si (KR)

(72) Inventors: Joon-hwan Kwon, Suwon-si (KR); Hong-uk Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/478,034

(22) PCT Filed: Jan. 17, 2018

(86) PCT No.: PCT/KR2018/000802
§ 371 (c)(1),
(2) Date: Jul. 15, 2019

(87) PCT Pub. No.: WO2018/135856
PCT Pub. Date: Jul. 26, 2018

(65) Prior Publication Data
US 2019/0370306 A1 Dec. 5, 2019

(30) Foreign Application Priority Data
Jan. 23, 2017 (KR) .................. 10-2017-0010473

(51) Int. Cl.
*G06F 16/955* (2019.01)
*G06F 21/60* (2013.01)
(Continued)

(52) U.S. Cl.
CPC .......... *G06F 16/9566* (2019.01); *G06F 21/60* (2013.01); *H04L 9/40* (2022.05);
(Continued)

(58) Field of Classification Search
CPC .... G06F 16/9566; G06F 21/60; G06F 16/955; G06F 21/604; H04L 29/06; H04L 63/08;
(Continued)

(56) References Cited

U.S. PATENT DOCUMENTS 10,204,704 B1 * 2/2019 Wurst ................ G16Z 99/00
2005/0204173 A1 * 9/2005 Chang .................. H04L 9/3231
726/19

(Continued)

FOREIGN PATENT DOCUMENTS

| KR | 10-100677759 B1 | 2/2007 |
| KR | 10-100890720 B1 | 3/2009 |
| KR | 10-2014-0004962 A | 1/2014 |

OTHER PUBLICATIONS

Korean Office Action dated Jan. 11, 2021, issued in Korean Application No. 10-2017-0010473.

*Primary Examiner* — Jae Y Lee
(74) *Attorney, Agent, or Firm* — Jefferson IP Law, LLP

(57) ABSTRACT

An electronic device is disclosed. The electronic device comprises: a communication unit for performing communication with a server; and a processor which, when a user inputs a user command for accessing the server through a uniform resource locator (URL) including resource access requirement information for a resource, required by the server to provide a service, determines whether a resource corresponding to the resource access requirement information exists in the electronic device, and according to whether the resource corresponding to the resource access requirement information exists, controls the communication unit such that access to the server is performed using a network address included in the URL.

14 Claims, 11 Drawing Sheets

(51) Int. Cl.
  *H04L 9/40* (2022.01)
  *H04L 67/02* (2022.01)
(52) U.S. Cl.
  CPC ............ *H04L 63/08* (2013.01); *H04L 63/101* (2013.01); *H04L 67/02* (2013.01)
(58) Field of Classification Search
  CPC ... H04L 63/101; H04L 67/02; H04L 63/0823; H04L 63/168; H04L 63/0861; H04L 63/10
  See application file for complete search history.

(56) References Cited

U.S. PATENT DOCUMENTS

| | | | |
|---|---|---|---|
| 2010/0131583 | A1 | 5/2010 | Lee et al. |
| 2010/0229045 | A1 | 9/2010 | Schultz et al. |
| 2011/0219427 | A1 | 9/2011 | Hito et al. |
| 2012/0185382 | A1 | 7/2012 | Fischer et al. |
| 2012/0185874 | A1* | 7/2012 | Cookson ................ H04L 67/10 719/313 |
| 2012/0310788 | A1* | 12/2012 | Naono ................... G06Q 30/06 705/27.1 |
| 2012/0317233 | A1 | 12/2012 | Redpath et al. |
| 2013/0054802 | A1* | 2/2013 | Donzis ................. G06F 16/951 709/225 |
| 2014/0082715 | A1 | 3/2014 | Grajek et al. |
| 2014/0189479 | A1 | 7/2014 | Glennon et al. |
| 2015/0180981 | A1 | 6/2015 | Tan et al. |
| 2016/0309015 | A1 | 10/2016 | Lee et al. |
| 2017/0187536 | A1* | 6/2017 | Meriac ................... H04L 67/02 |

\* cited by examiner

ELECTRONIC DEVICE AND METHOD FOR ACCESSING SERVER BY SAME

TECHNICAL FIELD

The disclosure relates to an electronic device and a method for accessing a server thereof and, more particularly, to an electronic device for accessing a server through a uniform resource locator (URL) and a method for accessing a server thereof.

BACKGROUND ART

With the recent development of electronic technology, a smart device such as a smartphone and a table PC has been popularized, and the smart device provides various contents to satisfy detailed needs of a customer.

For example, when the URL displayed on a web page or a messenger is selected, a smart device may execute an application capable of processing the corresponding URL, and a user may use various services provided through the corresponding URL.

In the meantime, in order to use a service provided by a server, a resource for using a corresponding service may be required in the smart device. For example, when a user desires to purchase a product on an Internet shopping server, a certificate for payment may be required for the smart device.

However, in the related art, it is common to request a certificate at a payment stage which is a final step for purchasing a product, and accordingly, a user may feel inconvenient, as the user has to cancel all steps that have been performed for the purchase of the product, and perform a step for purchasing the product from the beginning after installing the certificate.

DETAILED DESCRIPTION OF THE DISCLOSURE

Technical Objects

The disclosure has been made in order to solve the above-mentioned problems, and the purpose is to provide an electronic device to determine whether to access a server using resource access requirement information included in the URL, and a method for accessing a server thereof.

Technical Solving Method

According to an embodiment of the disclosure to achieve the above-described object, an electronic device includes a communication unit for performing communication with a server, and a processor to, when a user command for accessing a server through a uniform resource locator (URL) including resource access requirement information for a resource, required by the server to provide a service, is inputted, determine whether a resource corresponding to the resource access requirement information exists in the electronic device, and according to whether the resource corresponding to the resource access requirement information exists, control the communication unit such that access to the server is performed using a network address included in the URL.

The processor may, based on a determination of a resource corresponding to the resource access requirement information existing, access the electronic device to the server, and based on a determination of a resource corresponding to the resource access requirement information not existing, perform error processing.

The processor may determine whether an application capable of accessing the server through the network address exists, among applications installed in the electronic device, and based on a determination of the application existing, access the server by the electronic device by executing the determined application.

The processor may, based on a determination of an application capable of accessing the server through the network address not existing, among applications installed in the electronic device, perform error processing.

The electronic device according to an embodiment may further include a display, and the processor may, based on a determination of a resource corresponding to the resource access requirement information not existing, control the display to display a notification message notifying that the resource is not existing.

The processor may determine whether the resource exists using an application installed in the electronic device through an application programming interface (API).

The resource access requirement information may include authentication information required for providing the service and information on a sensor for acquiring the authentication information.

According to an embodiment, a method for accessing a server by an electronic device includes receiving a user command to access the server through a uniform resource locator (URL) including resource access requirement information for a resource, required by the server to provide a service; determining whether a resource corresponding to the resource access requirement information exists in the electronic device; and according to whether the resource corresponding to the resource access requirement information exists, accessing to the server is performed using a network address included in the URL.

The accessing to the server may include, based on a determination of a resource corresponding to the resource access requirement information existing, accessing the server by the electronic device using the network address, and based on a determination of a resource corresponding to the resource access requirement information not existing, performing error processing.

The accessing to the server may include determining whether an application capable of accessing the server through the network address exists, among applications installed in the electronic device, and based on a determination of the application existing, accessing the electronic device to the server by executing the determined application.

The accessing to the server may include, based on a determination of an application capable of accessing the server through the network address not existing, among applications installed in the electronic device, performing error processing.

The method of accessing the server by the electronic device according to an embodiment may further include, based on a determination of a resource corresponding to the resource access requirement information not existing, displaying a notification message notifying that the resource is not existing.

The determining whether the resource exists may include determining whether the resource exists using an application installed in the electronic device through an application programming interface (API).

The resource access requirement information may include authentication information required for providing the service and information on a sensor for acquiring the authentication information.

Advantageous Effects

According to various embodiments as described above, the electronic device accesses the server when there is a resource corresponding to the resource access requirement information included in the URL of the electronic device and thus, the user inconvenience may be minimized, and unnecessary network data use, memory use, and battery consumption of the electronic device may be prevented.

BEST MODE

Detailed Description of Embodiments

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

When it is decided that a detailed description for the known art related to the disclosure may unnecessarily obscure the gist of the disclosure, the detailed description will be omitted.

Embodiments of the disclosure will be described in detail with reference to the accompanying drawings, but the disclosure is not limited to embodiments described herein.

Hereinafter, the display device according to an embodiment will be described with reference to the drawings.

Figure 1:
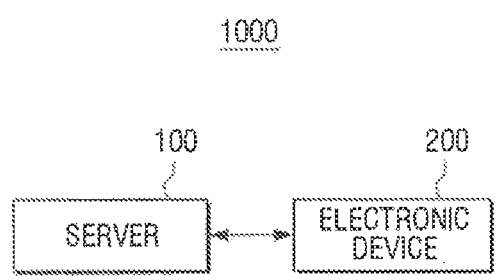
FIG. 1 is a block diagram provided to describe an access system according to an embodiment.

FIG. 1 is a block diagram provided to describe an access system according to an embodiment.

Referring to FIG. 1, an access system 1000 includes a server 100 and an electronic device 200.

Here, the server 100 may be implemented as a central server (or an integration server) for interacting between various operating systems and applications in a network system, a cloud server using cloud computing technology, or the like. Here, the cloud computing refers to an Internet-based computing technology, and is a web-based software service which uses a program installed in the utility data server of the Internet and calls the program into a computer or a mobile phone for use.

First of all, the server 100 may generate the URL. To be specific, the server 100 may generate the URL including a network address and resource access requirement information.

Here, the network address may be a character string representing a location of the server 100 on the network, and the resource access requirement information may be a character string representing information about resources that the server 100 requires to provide the service.

The server 100 may transmit the generated URL to the electronic device 200. The embodiment is not limited thereto, and another electronic device (not shown) may transmit the URL generated in the server 100 to the electronic device 200. For example, a user of another electronic device (not shown) may transmit the URL generated in the server 100 to the electronic device 200.

In the meantime, when a user command for accessing the server 100 is inputted through the received URL, the electronic device 200 may determine whether a resource corresponding to the resource access requirement information exists in the electronic device 200 to decide whether to access the server 100 according to a determination result, or call an application for processing the URL in the electronic device.

Accordingly, the electronic device 200 according to an embodiment may determine whether to access a server according to the existence or absence of resources, and thus may prevent unnecessary network data use of an electronic device and minimize inconvenience of a user. This will be described in more detail below.

Figure 2:
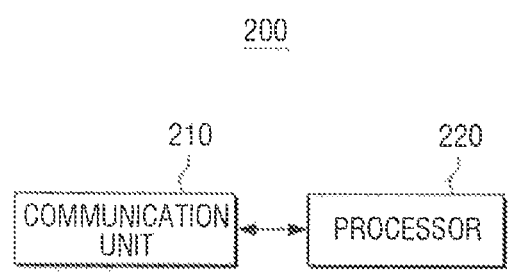
FIG. 2 is a block diagram provided to describe an electronic device according to an embodiment.

FIG. 2 is a block diagram provided to describe an electronic device according to an embodiment.

Here, the electronic device 200 may be implemented as various electronic devices such as a table PC, a notebook PC, a desk top, a smart TV, or the like, including a mobile phone.

Referring to FIG. 2, the electronic device 200 includes a communication unit 210 and a processor 220.

The communication unit 210 may transmit or receive various data through communication with the server 100 or another electronic device (not shown). In particular, the communication unit 210 may receive the URL through communication with the server 100 or another electronic device (not shown).

A network which the communication unit 210 may use to perform communication with the server 100 or another electronic device (not shown) is not limited to a particular format. Specifically, the communication unit 210 may use a mobile communication network such as 3rd generation (3G), 3rd generation partnership project (3GPP), long term evolution (LTE) and the like to perform communication with the server 100, or use near-field communication network such as a Wi-Fi, a Bluetooth, or the like, in addition to the mobile communication network described above, in order to perform communication with another device (not shown).

For this purpose, the communication unit 210 may include a Wi-Fi chip, a Bluetooth chip, a wireless communication chip, or the like.

The processor 220 controls the overall operations of the electronic device 200. For example, the processor 220 may operate an operating system or an application program to control hardware or software components connected to the processor 220, and may perform various data processing and operations. In addition, the processor 220 may load and process instructions or data received from at least one of the other components into volatile memory, and store the various data in a non-volatile memory.

The processor 220 may be implemented as a dedicated processor (for example, an embedded processor) for performing a corresponding operation or a generic-purpose processor (for example: CPU or an application processor) to perform the operations, by executing one or more software programs stored in a memory device.

The processor 220 may receive the URL from the server 100 or another electronic device (not shown).

Here, the URL may include network address and resource access requirement information. The embodiment is not limited thereto, and the URL may include a protocol, which is one of a communication rule, and may further include a character string regarding a file directory representing a location where a file is addressed in the server 100.

Meanwhile, as described above, the resource access requirement information indicates information on resources requested by the server 100 to provide a service. Specifically, the resource access requirement information may include the authentication information requested by the server 100 to provide a service or information of a sensor for obtaining the authentication information.

More specifically, in order to use the service provided by the server 100, the electronic device 200 may require a specific resource. For example, when the server 100 provides services such as Internet banking, shopping, etc., the electronic device 200 may be required to have a resource for payment, that is, a certificate. In addition, when the server 100 requires user identification information such as a fingerprint or iris of the user, the electronic device 200 may be requested to have a resource for user identification, that is, a fingerprint scanner for fingerprint scanning or an infrared camera for iris recognition.

As described above, the resource access requirement information means a character string including information on a resource requested by the server 100 for providing a service in the URL.

When a user command for accessing the server 100 is inputted through the URL, the processor 220 may determine whether a resource corresponding to the resource access requirement information exists in the electronic device 200.

Specifically, when a user command to access the server 100 through the URL is inputted, the processor 220 may determine whether a resource corresponding to the resource access requirement information included in the URL exists in the electronic device 200.

For example, when the URL is http://xxx.com?req_res1=fingerprint&req_res2=certificate, the processor 220 may determine that the resource required to use the service provided by the web page named xxx.com is fingerprint information (req_res1=fingerprint) and a certificate information (req_res2=certificate).

The processor 220 may determine whether the fingerprint information and the certification information which are the determined resources exist in the electronic device 200.

For this purpose, the processor 220 may use fingerprint data and certificate data stored in a storage (not shown). Specifically, if there exist fingerprint data and certificate data in the storage (not shown), the processor 220 may determine that a resource exists in the electronic device 200, and if the fingerprint data and the certificate data do not exist in a storage (not shown), the processor 220 may determine that no resource exists in the electronic device 200.

In addition, the processor 220 may determine whether a component capable of generating the determined resource exists in the electronic device 200. For example, if the determined resource is fingerprint information or iris information, the processor 220 may determine whether a fingerprint scanner for generating the fingerprint information and an infrared camera for generating the iris information exist in the electronic device 200. For this, as described above, the processor 220 may use the fingerprint scanner-related data and the camera-related data stored in the storage (not shown).

Meanwhile, the user command may be a user operation for selecting the URL displayed through a display (not shown) of the electronic device 200. For example, a user manipulation to select the URL may be an operation of touching the URL displayed on a display (not shown).

Thereafter, processor 220 may determine whether to access the server 100 using a network address included in the URL according to whether the resource corresponding to the resource access requirement information exists in the electronic device 200.

Specifically, when it is determined that there is a resource corresponding to the resource access requirement information, the processor 220 may access the server 100 using the network address included in the URL, and if it is determined that the resource corresponding to the resource access requirement information does not exist, the processor 220 may perform error processing.

Here, the error processing indicates that the electronic device 200 does not access the server 100.

In some cases, if it is determined that the resource corresponding to the resource access requirement information does not exist, the processor 220 may display a notification message indicating that the resource does not exist.

Specifically, the processor 220 may display a notification message including a message indicating that the server 100 may not be accessed, or may display a notification message including a message that a specific resource is necessary to access the server 100.

When it is determined that the resource corresponding to resource access requirement information exists, the processor 220 may determine whether an application to access the server 100 through the network address exists, among the applications installed in the electronic device 200. For example, if the URL is http://xxx.com?req_res1=fingerprint&req_res2=certificate, the processor 220 may to determine whether an application which may access a network address of xxx.com exists in the electronic device 200.

Here, an application capable of accessing the server 100 may be an application capable of processing the URL. For example, if the URL includes the network address of the server 100 providing a financial service, the application that may access the server 100 may be a banking application that provides the financial service, and if the URL includes a network address of the server 100 providing an Internet shopping service, an application that may access the server 100 may be an application provided by a company which operates the Internet shopping.

If it is determined that there is an application capable of accessing the server 100, the processor 220 may access the server 100 by executing the determined application, and if it is determined that there is no application that may access the server 100, the processor 220 may perform error processing.

Here, the error processing means that the electronic device 200 does not access the server 100.

In some cases, if the processor 220 determines that there is no application capable of accessing the server 100, the processor 220 may display a notification message indicating that the application does not exist.

For example, the processor 220 may display a notification message including a message indicating that the corresponding application is not installed, or display a notification message including a message that installation of a specific application is required to access the server 100.

As described above, the electronic device 200 according to an embodiment may access the server 100 using a network address included in the URL, when a resource corresponding to the resource access requirement information included in the URL exists, and an application capable of accessing the server 100 using a network address included in the URL exists. Therefore, unnecessary use of network data, memory use, and battery consumption of the electronic device may be prevented.

In the meantime, in the above-described embodiment, it has been described that the electronic device 200 determines whether a resource corresponding to the resource access requirement information exists in the electronic device 200, but whether a resource exists may be determined through an application.

That is, the processor 220 may determine whether a resource exists using an application installed in the electronic device 200.

Specifically, when a user command to access the server 100 through the URL including resource access requirement information is inputted in the application installed in the electronic device 200, a server (not shown) for managing the application installed in the electronic device 200 may be connected to the electronic device 200 through an application programming interface (API) to determine whether a resource exists in the electronic device 200.

For this purpose, the application management server (not shown) may include a processor (not shown) which performs the same or similar function with the processor 220 of the electronic device 200.

In other words, the application management server (not shown) may determine whether a resource exists in the electronic device 200, and determine whether an application which may access the server 100 exists.

Thereafter, if it is determined that a resource does not exist in the electronic device 200, the application management server (not shown) may perform error processing. In contrast, when it is determined that the resources exists in the electronic device 200, the application management server (not shown) may determine that an application which may access the server 100 exists in the electronic device 200 using a network address included in the URL.

If it is determined that an application which may access the server 100 does not exist in the electronic device 200, the application management server (not shown) may perform error processing. In contrast, if it is determined that an application which may access the server 100 exists in the electronic device 200, the application management server (not shown) may execute the corresponding application and access the electronic device 200 to the server 100.

As such, the electronic device 200 according to an embodiment may determine whether a resource exists by using an application installed in the electronic device 200. Therefore, in a case whether the electronic device 200 may not determine whether a resource exists, a same function may be performed as the case where it is possible to determine whether a resource exists.

Hereinafter, a method of accessing the server 100 by the electronic device 200 using the URL including resource access requirement information will be described in detail with reference to an embodiment.

Figure 3A:
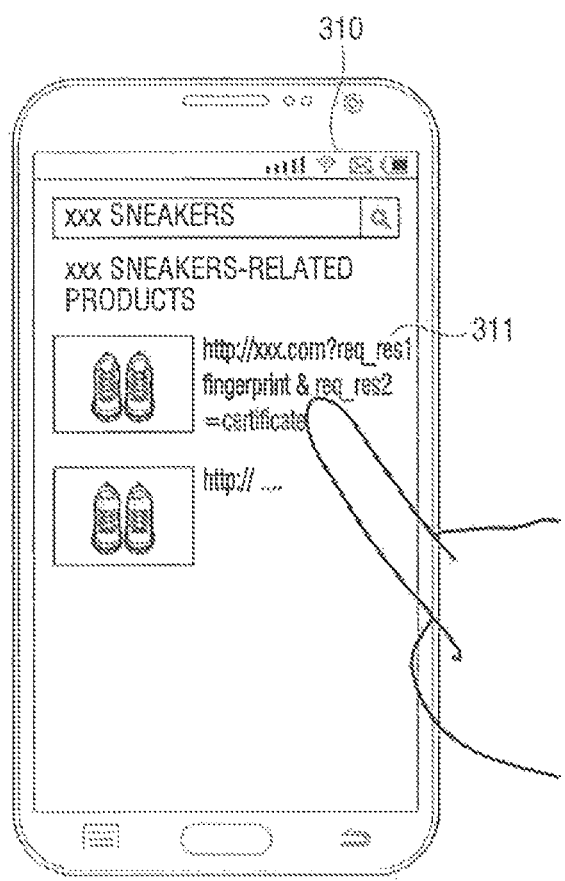
FIGS. 3A and 3B are a view provided to describe a URL including resource access requirement information according to an embodiment.
Figure 3B:
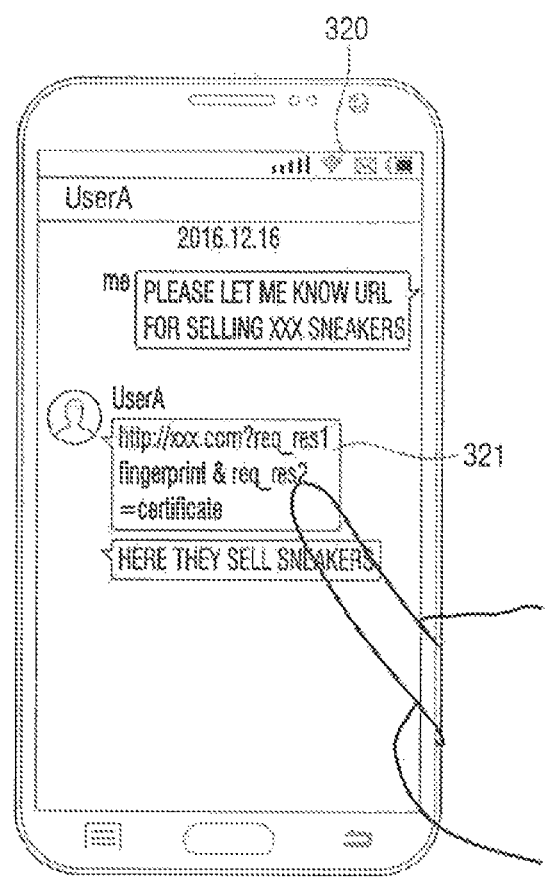

FIGS. 3A and 3B are view provided to describe the URL including resource access requirement information according to an embodiment.

Referring to FIG. 3A, the electronic device 200 may display a screen 310 including a URL 311 including resource access requirement information.

Specifically, when a user inputs a search command into a search window through a web page on which a user may search for a product, the server 100 may generate the URL 311 including the product information related to the searched product and resource access requirement information.

The electronic device 200 may receive, from the server 100, the URL 311 including product information and resource access requirement information generated from the server 100 and display the same.

In the above example, it has been described that the URL 311 including the resource access requirement information is received from the server 100. However, the URL 311 including the resource access requirement information may be received from another electronic device (not shown).

For example, referring to FIG. 3B, a user of electronic device 100 may receive a URL 321 including resource access requirement information from a user of another electronic device (not shown) using a messenger application.

Here, a user of another electronic device (not shown) may transmit the URL 321 including the resource access requirement information searched from a web page to a user of the electronic device 100 through a messenger application, or directly input the URL 321 including the resource access requirement information and transmit the URL 321 to a user of the electronic device 200.

Though not illustrated in the drawings, a URL including resource access requirement information in a format of using and sharing via social networking service (SNS), or the like may be received.

When a user command to access the server 100 is inputted through the URL 311 or 321 including the displayed resource access requirement information, the electronic device 200 may determine whether a resource corresponding to the resource access requirement information exists in the electronic device 200.

Here, the user command for accessing the server 100 may be a user operation that touches the URLs 311 and 321, as illustrated in FIGS. 3A and 3B. Although it has been described that the URLs 311 and 321 are touched with fingers, but the user operations may be performed by touching the URLs 311 and 321 using a touch tool such as a stylus, or the like.

In the case of the electronic device 100 which may not include a touch screen, the operation may be an operation to select or click the URLs 311 and 321 using a device such as a keyboard or a mouse.

Figure 4A:
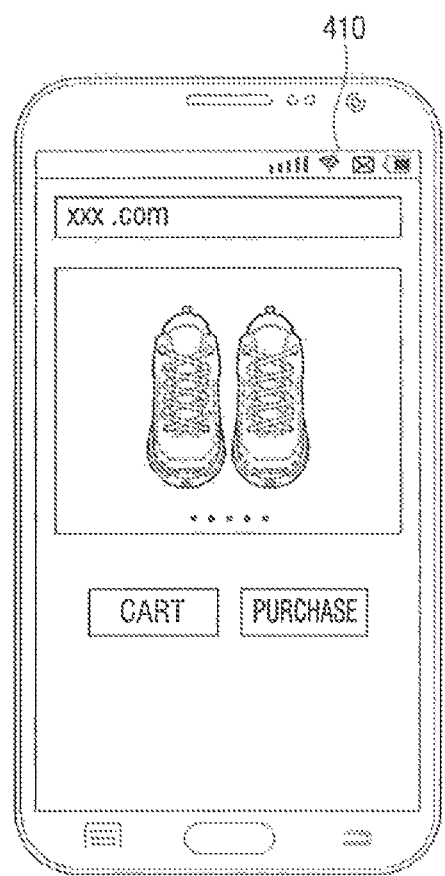
FIG. 4A is a view provided to describe that, when a resource exists in an electronic device, accessing the server according to an embodiment.

When it is determined that the resource corresponding to the resource access requirement information exists in the electronic device 200, the electronic device 200 may access the server 100 using a network address included in the URLs 311 and 321 as shown in FIG. 4A. Accordingly, the user may be provided with services such as purchasing goods of interest at the network address or using a settlement service of a bank, or the like.

In the meantime, if it is determined that a recourse corresponding to the resource access requirement information does not exist in the electronic device 200, the electronic device 200 may perform error processing.

Figure 4B:
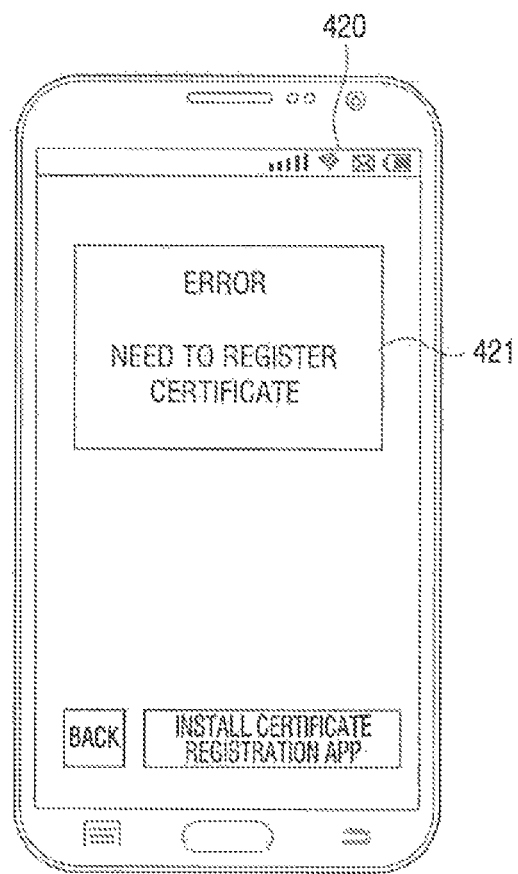
FIG. 4B is a view provided to describe, when a resource does not exist in an electronic device, performing error processing according to an embodiment.

For example, referring to FIG. 4B, when the resource corresponding to the resource access requirement information is a certificate and the electronic device 200 determines that the certificate does not exist, the electronic device 200 may display a screen 420 including a message 421 indicating that registration of a certificate is necessary.

Accordingly, it is possible to minimize the inconvenience of the user by minimizing the unnecessary use of network data by requesting the certificate registration from the beginning rather than requiring the certificate registration only after reaching the payment step which is the final step for purchasing a product.

In the meantime, if it is determined that a resource corresponding to the resource access requirement information exists, the electronic device 200 may determine whether there is an application which may access the server 100 through the network address included in the URL, among the applications installed in the electronic device 200.

For example, if the application that may access the server 100 is a banking application that provides financial services, the electronic device 200 may determine whether the corresponding banking application exists in the electronic device 200, and when the application is an Internet shopping application providing a shopping service, the electronic device 200 may determine whether the corresponding Internet shopping application exists in the electronic device 200.

If it is determined that the application which may access the server 100 exists, the electronic device 200 may execute the corresponding application and access the server 100, as illustrated in FIG. 4A.

If it is determined that an application which may access the server does not exist, the electronic device 200 may perform error processing.

Figure 5:
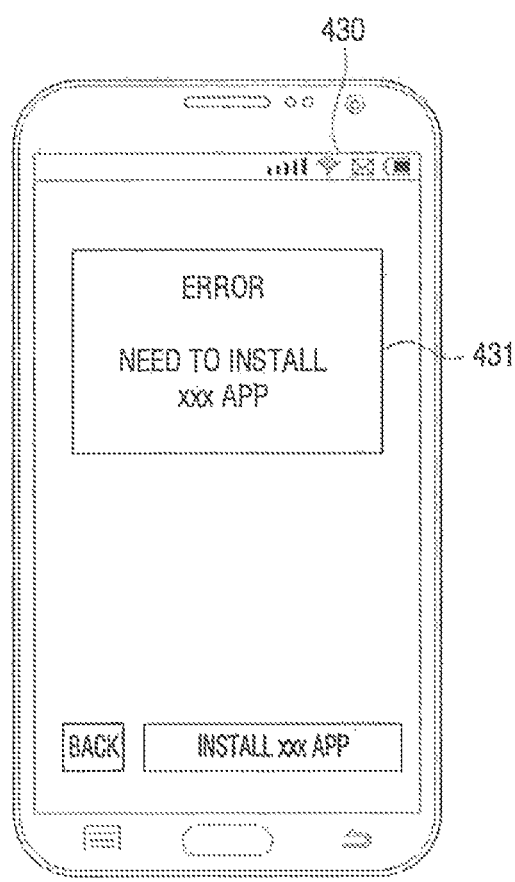
FIG. 5 is a view provided to describe, when an application capable of accessing the server does not exist in the electronic device, performing error processing according to an embodiment.

For example, as illustrated in FIG. 5, as the application which may access the server 100 does not exist in the electronic device 200, the electronic device 200 may display on a screen 430 including a message 431 indicating that installation of the corresponding application is necessary.

Accordingly, if the corresponding application does not exist, instead of providing a screen for installation of the corresponding application immediately without a separate error processing, a user's selection may be led. Therefore, a user's need may be further satisfied.

Figure 6:
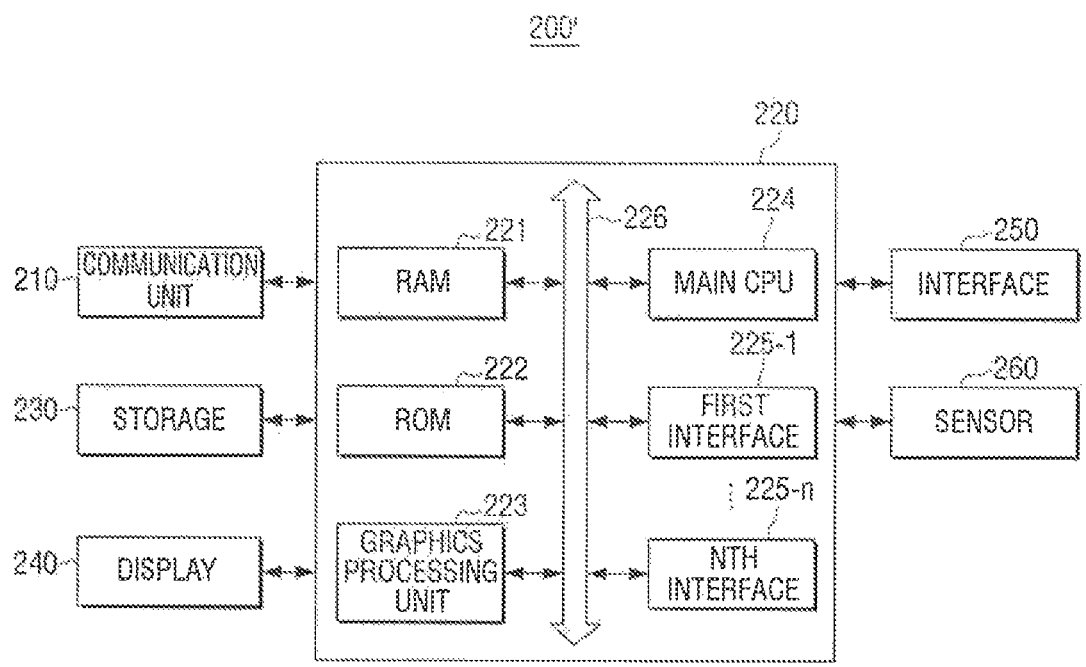
FIG. 6 is a block diagram provided to describe a detailed configuration of an electronic device according to an embodiment.

FIG. 6 is a block diagram provided to describe a detailed configuration of an electronic device according to an embodiment.

Referring to FIG. 6, an electronic device 200' according to an embodiment may include a communication unit 210, a processor 220, a storage 230, a display 240, an interface 250, and a sensor 260. The description which overlaps the above description will be omitted.

The storage 230 may store an operating system (OS) for controlling overall operations of the components of the electronic device 200' and a command or data related to the component of the electronic device 200'.

Accordingly, the processor 220 may control a plurality of hardware or software components of the electronic device 200 using various instructions or data stored in the storage 210, load and process instructions or data received from at least one of other components to a volatile memory, and store various data in the non-volatile memory. In particular, the storage 210 may store data regarding a resource included in the electronic device 200 according to an embodiment.

For example, if the resource of the electronic device 200 is a certificate, the storage 230 may store a certificate file, and if the resource is a fingerprint scanner, the storage 230 may store a file related to the fingerprint scanner installed in the electronic device 200. This is merely exemplary, and if the resource is an infrared rays (IR) camera, the storage 230 may store a file related to the IR camera installed in the electronic device 200. As such, the storage 230 may store various data related to resources included in the electronic device 200.

The storage 230 may include a programming module such as an application. Here, the programming module may be composed of software, firmware, hardware, or a combination of at least two of them.

For this purpose, the storage 230 may include a non-volatile memory, volatile memory, a hard disk drive (HDD), or a solid state drive (SSD).

The storage 230 may include an external storage (for example, a universal serial bus (USB) memory, etc., not shown) connectable to the electronic device 100.

The display 240 may display various screens. In particular, the display 240 may display the URL including resource access requirement information, a screen for execution of a network address included in the URL, and a screen for performing error processing due to the absence of resource access requirement information, or the like.

For this purpose, the display 240 may be realized as various types of displays such as a liquid crystal display panel (LCD), organic light emitting diodes (OLED), liquid crystal on silicon (LCoS), digital light processing (DLP), or the like. In addition, in the display 240, a backlight unit, a driving circuit which may be implemented as a format such as an a-si TFT, low temperature poly silicon (LTPS) TFT, organic TFT (OTFT), or the like, may be included as well.

The interface 250 may receive various user commands. In particular, the interface 250 may receive a user command to access the server 100 through the URL.

The interface 250 may be implemented as various formats according to an implementation example of the electronic device 200'.

Specifically, when the electronic device 200' is implemented as a touch-based mobile terminal or a display device, or the like, the interface 250 may be implemented in the form of a touch screen forming a layer structure with a touch pad. In addition, when the electronic device 200' is implemented as a computer, or the like, which does not provide a touch function, the interface 250 may be implemented in a form such as a keyboard or a mouse.

The sensor 260 performs various functions. In particular, the sensor 260 may obtain user identification information or user authentication information. For example, the user identification information or the authentication information may be a fingerprint or iris of the user, and the sensor 260 may be a fingerprint scanner for fingerprint scanning or an IR camera for iris recognition.

The processor 220 is a configuration to control overall operations of the electronic device 200'.

To be specific, the processor 220 may include a random-access memory 221, a read-only memory 222, a graphics processing unit 223, a main central processing unit (CPU) 224, first to $n^{th}$ interfaces 225-1 to 225-n, and a bus 226. Here, the RAM 221, ROM 222, graphics processing unit 223, main CPU 224, first to $n^{th}$ interfaces 225-1 to 225-n, or the like, may be connected to each other through the bus 226.

The first to $n^{th}$ interfaces 225-1 to 225-n are connected to the various components as described above. One of the interfaces may be network interface that is connected to an external device through network.

The main CPU 224 accesses the storage 230 and performs booting using operating system stored in the storage 230. The main CPU 224 may perform various operations using various programs, contents, data, or the like stored in the storage 230.

The RAM 221 stores a command set and the like for booting the system. When the power is supplied to the electronic device 200', the main CPU 224 copies the OS stored in the storage 230 to the RAM 221 according to the instruction stored in the ROM 222, and executes the OS to boot the system. When the booting is completed, the main CPU 224 copies various programs stored in the storage 230 to the RAM 221, executes the program copied to the RAM 221, and performs various operations.

The graphics processing unit 223 generates a display screen that includes various objects such as icons, images, texts, and the like using an operator (not shown) and a renderer (not shown). For example, the graphics processing unit 223 generates a screen including the URL including resource access requirement information. The operator (not shown) calculates an attribute value such as a coordinate value, a shape, a size, and a color to be displayed by each object according to the layout of the screen based on the received control command, and generates a display screen of various layouts including the object, based on the calculated attribute value. The screen generated by the renderer (not shown) is displayed in a user interface area of the display 240.

Figure 7:
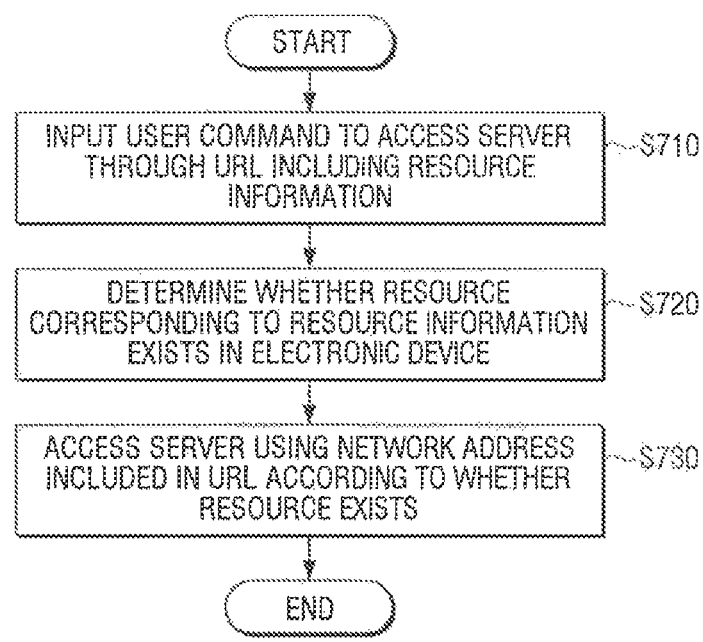
FIG. 7 is a flowchart provided to describe a method for accessing the server by the electronic device according to an embodiment.

FIG. 7 is a flowchart provided to describe a method for accessing the server by the electronic device according to an embodiment.

First, when a user command to access a server is inputted through the URL including the resource access requirement information in step S710, the electronic device determines whether a resource corresponding to the resource access requirement information exists in the electronic device in step S720.

Then, the electronic device accesses the server using network address included in the URL according to whether the resource exists in step S730.

Specifically, if it is determined that a resource corresponding to the resource access requirement information exists, the electronic device accesses the server by using the network address, and if it is determined that a resource corresponding to the resource access requirement information does not exist, the electronic device performs error processing.

Accordingly, when the resource required to use the service provided by the server does not exist in the electronic device, the user may receive the error-processing result and thus may minimize time waste and unnecessary network consumption.

Figure 8:
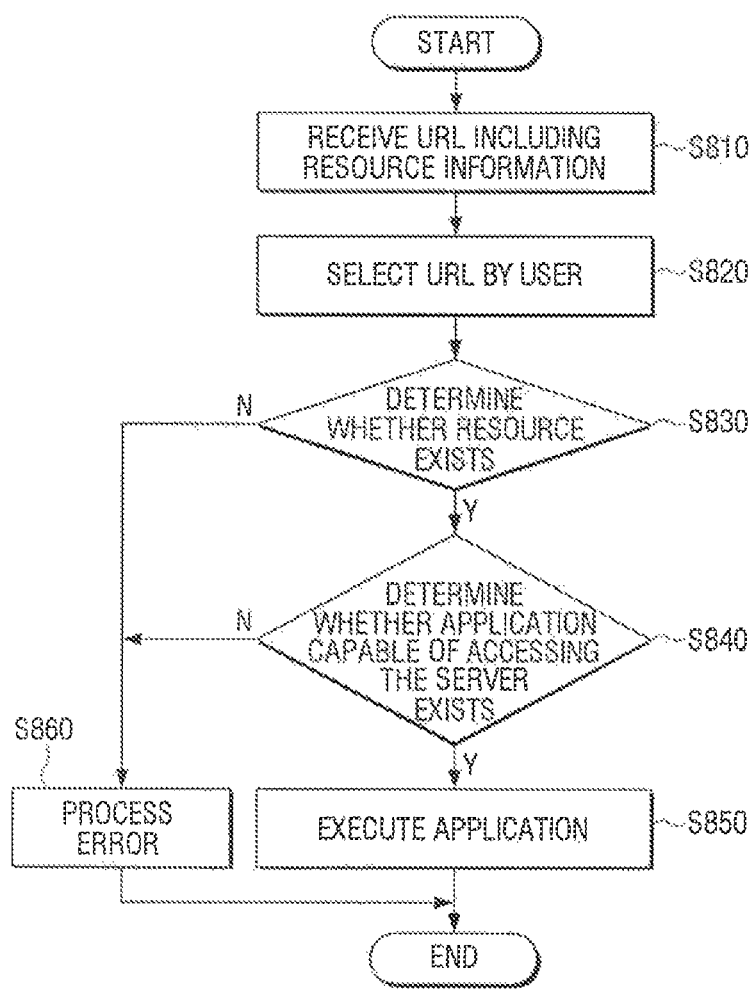
FIG. 8 is a flowchart to describe a method of accessing the server by the electronic device by determining whether a resource exists in the electronic device according to an embodiment.

FIG. 8 is a flowchart to describe a method of accessing the server by the electronic device by determining whether a resource exists in the electronic device according to an embodiment.

First, the electronic device receives the URL including resource access requirement information in step S610. Here, the electronic device may receive the URL from a server, and receive the URL from another electronic device.

When the user inputs a user command to select the URL in step S820, the electronic device determines whether the resource corresponding to the resource access requirement information exists in the electronic device in step S830.

Thereafter, if it is determined that the resource access requirement information does not exist, the electronic device performs error processing in step S860, and if it is determined that the resource access requirement information exists, it is determined whether an application that may access the server exists in step S840.

If it is determined that there is no application which may access the server, the electronic device may perform error processing in step S860, and if it is determined that an application which may access the server exists, the electronic device executes the corresponding application in step S850.

Figure 9:
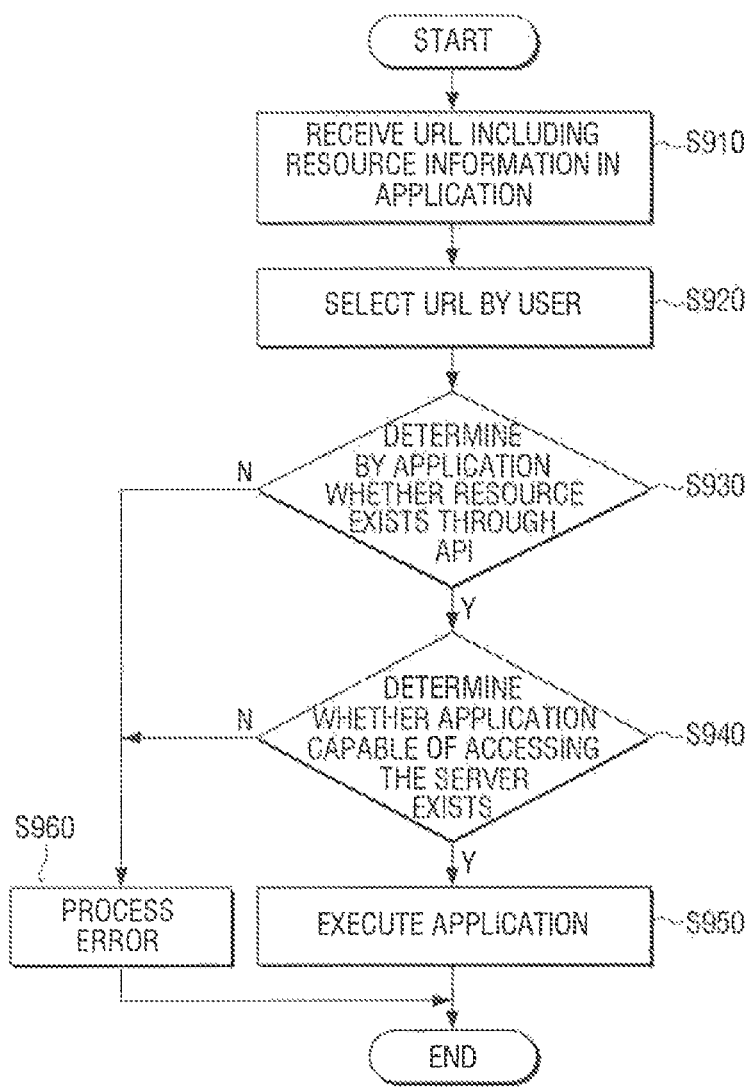
FIG. 9 is a flowchart to describe a method of accessing the server by the electronic device by determining whether a resource exists in the electronic device in an application according to an embodiment.

FIG. 9 is a flowchart to describe a method of accessing the server by the electronic device by determining whether a resource exists in the electronic device in an application according to an embodiment.

First, the URL including the resource access requirement information is received in an application installed in an electronic device in step S910. Here, the application may be an application capable of connecting and communicating with an electronic device through an application program interface (API). For example, the application may be a messenger application or the SNS application.

When the user inputs a user command for selecting the URL displayed in an application in step S920, the application may determine whether a resource corresponding to the resource access requirement information exists in the electronic device. Specifically, when a user command to access a server through the URL including the resource access requirement information is inputted, the application installed in the electronic device may connect the application management server to the electronic device 200 through the API to determine whether a resource exists in the electronic device.

If it is determined that the resource does not exist in the electronic device, the application installed in the electronic device may perform error processing in step S960, and if it is determined that the resource exists, it is determined that the application which may access the server exists.

If there is an application which may access the server does not exist in the electronic device, the error processing may be performed in step S960, and if it is determined that an application which may access the server exists, the corresponding application may be executed in step S950.

Accordingly, the electronic device according to an embodiment may determine whether a resource exists, by using an application installed in the electronic device. In this regard, even in a case where the electronic device may not determine whether the resource exists, the same function as the case where the electronic device may determine whether a resource exists may be performed.

A non-transitory computer readable medium which stores a program for sequentially executing a method for controlling an electronic apparatus according to an embodiment may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the disclosure. The present teaching can be readily applied to other types of apparatuses. Also, the description of the embodiments of the disclosure is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. An electronic device comprising:
    a communication unit configured to communicate with a server;
    a storage configured to store resource required for providing a service of the server;
    a display; and
    a processor configured to:
        based on a search command being input through a search window on a web page displayed on the display, receive, from a server, a uniform resource locator (URL) including a network address of the server for providing information related to the search command and information on a resource required to provide a service of the server,
        receive a user command for accessing a server through a uniform resource locator (URL) including a network address of the server and information on a resource required to provide a service,
        determine whether the resource is stored in the electronic device based on the information on the resource included in the URL,
        based on determining that the resource is stored in the electronic device, control the communication unit to access the server using the network address included in the URL,
        wherein the resource required for providing a service comprises authentication information required for providing the service and at least one of user identification information required for providing the service and information on a sensor for acquiring the user identification information, and
        based on determining that the authentication information required for providing the service is not stored in the electronic device, control the display to display a message indicating that registration of the authentication information to the electronic device is necessary.

2. The electronic device of claim 1, wherein the processor is configured to:
    based on the resource being existing in the electronic device, access the server through the communication unit, and
    based on the resource being not existing in the electronic device, perform error processing.

3. The electronic device of claim 2, wherein the processor is configured to:
    determine whether an application capable of accessing the server through the network address exists, among applications installed in the electronic device, and
    based on the application being existing, access the server through the communication unit by executing the determined application.

4. The electronic device of claim 3, wherein the processor is configured to, based on the application capable of accessing the server through the network address being not existing, among applications installed in the electronic device, perform error processing.

5. The electronic device of claim 2,
    wherein the processor is configured to, based on the resource being existing, control the display to display a notification message notifying that the resource is not existing.

6. The electronic device of claim 1, wherein the processor is configured to determine whether the resource exists using an application installed in the electronic device through an application programming interface (API).

7. The electronic device of claim 1, wherein the information on the resource comprises at least one of authentication information required for providing the service and information on a sensor for acquiring the authentication information.

8. A method for accessing a server by an electronic device, the method comprising:
    based on a search command being input through a search window on a web page displayed on a display of the electronic device, receiving, from a server, a uniform resource locator (URL) including a network address of the server for providing information related to the search command and information on a resource required to provide a service of the server;
    receiving a user command for accessing a server through a uniform resource locator (URL) including a network address of the server and information on a resource required to provide a service;
    determining whether the resource is stored in the electronic device based on the information on the resource included in the URL;
    based on determining that the resource is stored in the electronic device, accessing the server using the network address included in the URL,
    wherein the resource required for providing a service comprises authentication information required for providing the service and at least one of user identification information required for providing the service and information on a sensor for acquiring the user identification information; and
    based on determining that the authentication information required for providing the service is not stored in the electronic device, displaying a message indicating that registration of the authentication information to the electronic device is necessary.

9. The method of claim 8, wherein the accessing to the server comprises:
    based on the resource being existing in the electronic device, accessing the server using the network address, and
    based on the resource being not existing in the electronic device, performing error processing.

10. The method of claim 9, wherein the accessing to the server comprises:

determining whether an application capable of accessing the server through the network address exists, among applications installed in the electronic device, and based on the application being existing, accessing the electronic device to the server by executing the determined application.

11. The method of claim 10, wherein the accessing to the server comprises:

based on the application capable of accessing the server through the network address being not existing, among applications installed in the electronic device, performing error processing.

12. The method of claim 9, further comprising:

based on the resource being not existing, displaying a notification message notifying that the resource is not existing.

13. The method of claim 8, wherein the determining whether the resource exists comprise determining whether the resource exists using an application installed in the electronic device through an application programming interface (API).

14. The method of claim 8, wherein the information on the resource comprises at least one of authentication information required for providing the service and information on a sensor for acquiring the authentication information.

* * * * *